United States Patent
Lo Muzio et al.

(10) Patent No.: US 7,436,740 B2
(45) Date of Patent: Oct. 14, 2008

(54) WOBBLE DETECTION FOR PLAYBACK OF OPTICAL RECORDING MEDIA

(75) Inventors: Pierluigi Lo Muzio, Villingen-Schwenningen (DE); Friedrich Heizmann, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 658 days.

(21) Appl. No.: 10/975,787

(22) Filed: Oct. 28, 2004

(65) Prior Publication Data
US 2005/0094520 A1 May 5, 2005

(30) Foreign Application Priority Data
Oct. 31, 2003 (EP) .................................. 03024862

(51) Int. Cl.
*G11B 5/09* (2006.01)
(52) U.S. Cl. .................... 369/47.27; 369/53.2; 369/47.2
(58) Field of Classification Search .................. None
See application file for complete search history.

(56) References Cited

U.S. PATENT DOCUMENTS 7,099,244 B2 * 8/2006 Nakata et al. ............ 369/47.19
2002/0126607 A1 * 9/2002 Yamamoto et al. ....... 369/53.22

FOREIGN PATENT DOCUMENTS

EP   1 187 111   3/2002

* cited by examiner

*Primary Examiner*—Wayne Young
*Assistant Examiner*—Adam R Giesy
(74) *Attorney, Agent, or Firm*—Joseph J. Laks; Harvey D. Fried

(57) ABSTRACT

The present invention relates to a method and a device for detecting the type of wobble on an optical recording medium. According to the invention, a programmable digitally tuned oscillator is provided for detecting the wobble at different frequencies and the wobble signal is converted to the base band. Favorably the consistency of the phase of the wobble together with the amplitude of the wobble is used for verifying the presence of the wobble. For this purpose a Cartesian to Polar converter is provided.

12 Claims, 6 Drawing Sheets

WOBBLE DETECTION FOR PLAYBACK OF OPTICAL RECORDING MEDIA

This application claims the benefit, under 35 U.S.C. § 119 of European Patent Application 03024862.9, filed Oct. 31, 2003.

FIELD OF THE INVENTION

The present invention relates to a method and a device for detecting the type of wobble on an optical recording medium, and to an apparatus for reading from and/or writing to optical recording media using such method or device.

BACKGROUND OF THE INVENTION

For playback of optical recording media it is important to determine the type of the optical recording medium. In general there are different media types. A possible classification is: CD (Compact Disk), CD-R(W) (Compact Disk Recordable/Rewritable), DVD-ROM (Digital Versatile Disk Read-Only Memory), DVD-R(W) (Digital Versatile Disk-Recordable/Rewritable), DVD+R(W) (Digital Versatile Disk+Recordable/Rewritable).

To enable copy-protection, a player or recorder for DVD/CD needs to distinguish between read-only disks: DVD-Video, and recordable/rewritable disks: DVD-R(W), DVD+R(W), DVD-RAM Though the pre-recorded content is encrypted (CSS, Content Scrambling System, or CPPM, Content Protection for Prerecorded Media), encryption alone does not offer a protection against bit-copies. Therefore, the player or recorder should refuse playback of encrypted content from recordable media. However, playback of encrypted content from read-only media must not be inhibited.

In order to distinguish recordable media from read-only media, the presence of a wobble is favorably detected, as recordable media have a pre-groove wobble while read-only media do not contain any wobble.

Before playback it is useful to distinguish between

CD, CD-R/RW and

DVD-ROM, DVD-R/RW, DVD+R/RW

This can be achieved by analyzing the push-pull signal used for tracking, which is obtained by means of a proper combination of the four signals generated by four photodetectors of the optical pickup used for reading and/or recording. If the push-pull signal contains a wobble, the recording medium is recordable or rewritable. This is sufficient for determining the type of CD, but for DVD it is also important to distinguish between +R(W) and −R(W). If the wobble frequency for 1x speed is 817.5 kHz, the recording medium is +R(W). If the wobble frequency for 1x speed is 140 kHz, the recording medium is −R(W). The different wobble characteristics for different media are summarized in the following Table 1.

|  | DVD + RW | DVD − RW | CD − RW |
|---|---|---|---|
| channel bit rate (Mbit/s@1x) | 26.16 | 26.16 | 4.3218 |
| wobble frequency (kHz@1x) | 817.5 | 140.65 | 22.05 |
| channel bits per wobble (Nw) | 32 | 186 | 196 |
| wobble modulation | BPSK | AM | FM bi-phase |

As the ratio between the channel bit rate and the wobble frequency is constant, when the speed is not 1x the wobble frequency changes accordingly. The ratio is equal to the number of channel bits per wobble period, as listed in the table. The wobble signal and the data signal HF are fully synchronized, because they are obtained from the same four signals from the four photodetectors.

Before playback a wobble detector favorably provides the following information:
- if the recording medium is a CD, it should determine whether there is the wobble or not,
- if the recording medium is a DVD, it should determine whether there is a DVD+R(W) wobble or a DVD-R(W) wobble or no wobble.

SUMMARY OF THE INVENTION

It is an object of the invention to propose a wobble detector capable of providing the above information.

According to the invention the wobble detection is based on a vector analysis of the wobble signal. Both the phase and the amplitude of the wobble are measured. Measuring the amplitude only is not sufficient to guarantee a reliable detection of the presence of a wobble.

For this purpose a sort of vector spectrum analyzer is needed. Focus is on a low-cost implementation. Only a narrow band measurement of the wobble frequency is necessary, as not the whole spectrum of the push-pull signal is needed. This measurement is carried out in the digital domain with special care of the implementation cost. Therefore, sophisticated filters are avoided and necessary buses are reduced as much as possible without degrading the reliability of the detection. Although the wobble is phase modulated, a criterion is proposed for checking the consistency of the wobble phase. This is realized using a clock from a phase-locked loop, which is already available in the player or recorder, and computing its averaged absolute variation.

BRIEF DESCRIPTION OF THE DRAWINGS

For a better understanding of the invention, an exemplary embodiment is specified in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERED EMBODIMENTS

The invention is based on the measurement of the wobble signal. Unfortunately the measurement of the amplitude of the push-pull signal at the frequency of the wobble is not always sufficient to judge the existence of the wobble. The amplitude of the retrieved wobble signal might change for several factors. For instance it depends on the recording medium and on the optical pickup used for reading. Therefore, the choice of the threshold for the detector is difficult.

The detection is more reliable if also the phase of the wobble is used. If there is no wobble, the phase is uniformly distributed in the range $(-\pi,+\pi)$. If there is a wobble, its phase cannot vary in such a random way. Instead, it is almost constant.

The use of the phase is made difficult by a couple associated problems. The first problem results from the rotation speed of the recording medium, which is not exactly constant. When the speed is changed by a servo loop, also the wobble frequency changes and the wobble phase becomes random. In order to solve this problem, a phase-locked loop (PLL) is needed.

A PLL is already available for the read path, therefore, a possible solution is to use this PLL as it is to generate clock T_clk locked to the speed of the recording medium. This clock is used for synchronizing the wobble signal and the whole wobble detector. In this case the wobble phase is constant in time and the number of T_clk periods within the wobble period is fixed.

The advantage of this solution is evident. Using the data signal HF, the lock-in process of the PLL is faster and the frequency error as well as the phase error are smaller. This is due to the fact that the data signal HF has more energy and a higher signal to noise ratio. Furthermore, the frequency of the data signal HF is higher than the speed of the wobble signal.

A further obstacle is the phase modulation of the wobble of +R(W) and CD. This problem can be solved considering that the modulation index is low in both cases. In the case of +R(W) there are at maximum four phase jumps in 93 wobble periods.

Therefore, a proper averaging filter solves this problem. In the case of CD the frequency deviation is very small (1 kHz) in comparison with the carrier (22 kHz). Therefore, the phase of the wobble does not change very much between two wobble periods, only $\pi/11$. Moreover, this small phase variation is completely rejected if the quantisation step of the measured phase variation is higher than the small phase variation due to the frequency modulation.

Figure 1:
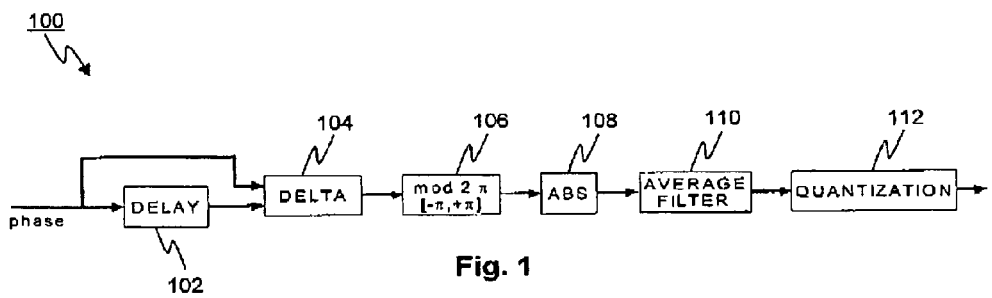
FIG. 1 shows a scheme of phase usage by computing its averaged absolute variation.

The phase is used by computing its averaged absolute variation each wobble period. This is depicted in FIG. 1. The phase is provided to a delay element 102. The delayed phase and the phase are inputted to a delta element 104 performing a delta operation. The output signal of the delta element 104 is provided to a modulus element 106. Its output signal is provided to an absolute-value generator 108. The signal is further provided to an average filter 110. The output of the average filter 110 is the input signal of a quantization element 112. The delta operation spreads the value of the phase over a doubled range $(-2\pi,+2\pi)$, which makes a modulus operation necessary. If a wobble is present, the result is close to zero. If no wobble is present, the averaged absolute variation is $\pi/2$ assuming that the signal is not correlated in two consecutive wobble periods.

Figure 2:
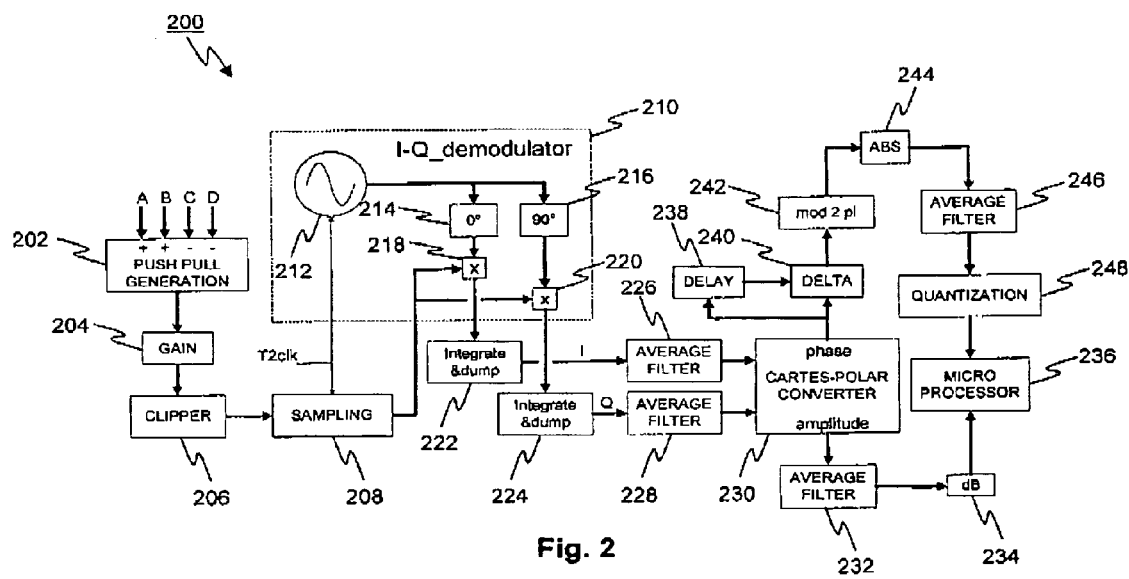
FIG. 2 depicts the architecture of a wobble detector according to the invention.

Another important part of the algorithm concerns the extraction of the wobble, in order to measure its phase and amplitude. For this purpose a correlator based on an IQ demodulator is used. The detailed architecture 200 of a wobble detector according to the invention is depicted in FIG. 2. The photodetector signals A, B, C, D are provided to a push pull generator 202, which is connected to an amplifier 204, which is connected to a clipper 206. The clipped signal is provided to a sampling device 208. Its output signal is the input signal of multiplying devices 218 and 220. T2clk is the reference clock of the sampling device and of the oscillator 212 of the IQ demodulator 210. The oscillator signal is phase shifted by 0° and 90° degrees by phase shifters 214 and 216, respectively, and is provided to the multiplying devices 218 and 220. The outputs of the multiplying devices 218, 220 are provided to integration and dump devices 222, 224, which provide I and Q output signals. These signals are filtered by average filters 226, 228 and are inputted to a Cartesian to polar converter 230, which provides an amplitude and a phase signal as output. The phase signal is provided to a system 100 according to FIG. 1, consisting of a delay element 238, a delta element 240, a modulus element 242, an absolute-value generator 244, an average filter 246 and a quantization element 248. Its output signal is provided to a microprocessor 236. The amplitude signal of the Cartesian to polar converter 230 is provided to an average filter 232 and dB calculator 234. The output signal is provided to the microprocessor 236. After the integration and dump, the IQ demodulator gives the I-component (in-phase) and the Q-component (in-quadrature) of the wobble signal. As mentioned before, it is very important to synchronize the signal with the clock T_clk. Consequently, this clock is used as the clock of the digital IQ demodulator.

Finally, the phase and the amplitude of the wobble are measured by means of a conversion from Cartesian to Polar coordinates. In this way the I- and Q-components are converted to the amplitude and phase components. By reading the measured values of phase and amplitude it is possible to detect whether a wobble is present or not:

high values of the amplitude and low values of the averaged absolute phase variation indicate that the recording medium is recordable, low values of the amplitude and high values of the averaged absolute phase variation indicate that the recording medium is not recordable.

Of course, in the case of DVD this measurement is repeated twice because the wobble frequency has different values for +R(W) and -R(W). Therefore, the signal should favorably be measured at both frequencies.

The architecture of the wobble detector shall now be explained in more detail. The four signals from the photodetectors (A, B, C, D) are combined to generate the push-pull signal. The push pull signal is then amplified to obtain a sufficient amplitude for the detection. The gain is variable for each medium, different gains are used for CD, DVD+R(W) and DVD-R(W). A clipper limits the dynamic range of the signal. This is useful especially in the case of DVD-R(W), because the peaks of land pre-pits in the wobble signal are eliminated without any loss of the wobble.

The IQ demodulator needs to be synchronized to the speed of the recording medium. Therefore, the signal is re-sampled by the clock T_clk. In addition, also the local oscillator of the demodulator uses the same clock. In order to reduce the complexity of the digital implementation it is useful to reduce the speed, wherefore a divided clock T2clk is used. The full speed of the signals A, B, C, D is not necessary for the push-pull signal, it can be sub-sampled.

Unfortunately the unbalanced data signal HF cannot be neglected, a low sampling might lead to a fold-back of this signal over the wobble frequency. Considering the typical extension of the spectrum of the data signal HF, there is no aliasing when the subsampling factor is two.

All the parameters of the detector are configured by a microprocessor, which handles also the last part of the algorithm running a small routine.

If the servo detects a CD, the microprocessor configures the oscillator of the demodulator to generate the CD wobble frequency. It also configures the parameters of other blocks for the CD case. Reading at low speed the values of amplitude (dB) and absolute phase variation, the microprocessor decides whether the recording medium is recordable or not.

If the servo detects a DVD, the microprocessor tests two cases separately. First it configures the oscillator of the demodulator to generate the DVD+R(W) wobble frequency. It also configures the parameters of other blocks for the DVD+R(W) case. The values of amplitude (dB) and absolute phase variation are stored. The same operation is then repeated for the DVD-R(W) case. By examining and comparing the values of the two cases, the microprocessor decides whether the recording medium is +R(W) or −R(W) or not recordable.

It might happen that the values, which are read by the microprocessor, are not high or low enough to allow a reliable decision. In that case the microprocessor repeats the reading until it obtains useful values for the decision.

In any case the data are fed to the microprocessor at low speed, it therefore has no difficulties to read them. I- and Q-data are supplied at the wobble speed, however, the average filters reduce the speed of the data considerably before the microprocessor.

The average filters are simple processing units, which compute the average of the input samples over a certain number N of samples, the number being programmed by the microprocessor. These units include:
- an accumulator for the summation of the input values, with a reset after N input samples,
- a division by N, and
- a sample and hold to keep the last calculated value at the output during the calculation of the following value.

The average filter is needed for the rejection of the phase modulation of the wobble of DVD+R(W) after the calculation of the absolute phase variation. For example, if the average is computed over 64 wobble periods, which include the four phase jumps of the ADIP (Address in Pre-Groove) bit, the result is $\pi/16$. This value is even smaller than $\pi/11$, which is the error of the phase measurement for CD. Therefore, also the error for DVD+R(W) can be neglected after the quantisation.

In order to obtain a precise synchronization of the amplitude with the phase, it is favorable to include a similar average filter in the amplitude path. This average filter improves the precision of the measurement.

In the case of DVD+R(W), a part of the average filter or even the whole filter can be moved before the polar conversion. This has two main advantages, namely a better noise rejection and a higher frequency selectivity. The first advantage, noise rejection, is obvious. When a wobble is present, I- and Q-components are always summed with the same phase. Therefore, the result of the average has the same amplitude as the input. On the contrary, when no wobble is present, the noise has a random phase and I- and Q-components are summed with a random phase. Therefore, the result has a smaller amplitude. The same filter cannot reduce the amplitude if it is operating after the Cartesian to Polar converter.

The second advantage, frequency selectivity, is also important. The frequency selectivity is the capability of the detector to pass only the signal at the frequency of the wobble, while all other components at all other frequencies are rejected.

Together with the integrate&dump the demodulator measures the correlation of the input signal with the wobble. Specifically, the correlation is measured for the two separate components. All harmonics of the wobble frequency are completely deleted.

However, other frequencies are not completely rejected. Particularly the sub-harmonics might give a contribution to the I- and Q-components and also a contribution to the average amplitude. By extending the correlation period to several wobble periods, the sub-harmonics are rejected as the average operation deletes the time varying I- and Q-components. If N1 is the number of wobble periods of the correlation, the frequency selectivity increases by a factor equal to N1. The average filter in combination with the integrate&dump corresponds to an integrate&dump with a longer integration period. Consequently, the frequency selectivity increases by a factor equal to the extension factor of the integration period.

In the case of a CD the average filters after the calculation of the phase variation are not strictly necessary. However, they are helpful as they increase the reliability of the measurement. In contrast, the average filters before the polar conversion are bypassed, otherwise the phase variation due to the modulation increases.

Also in the case of DVD-R(W) the average filters after the calculation of the phase variation are not strictly necessary. However, again they increase the reliability of the measurement. However, in this case also the average filters before the polar conversion are useful. They increase the frequency selectivity, which is needed to reduce the effect of land pre-pit peaks, whose spectrum is spread over a large bandwidth and which has a large component at the 16th sub-harmonic of the wobble. Also in the time domain the advantage for land pre-pit peaks is evident. These peaks can generate an error in the measurement of the wobble phase. Since in the following wobble period there is no peak, the error due to the peak could be interpreted as a phase variation. The average filter reduces this error because in 16 periods only a maximum of three peaks is possible, most of the time only one or two peaks are present. Therefore, a suitable average period is 16 wobble periods.

Figure 3:
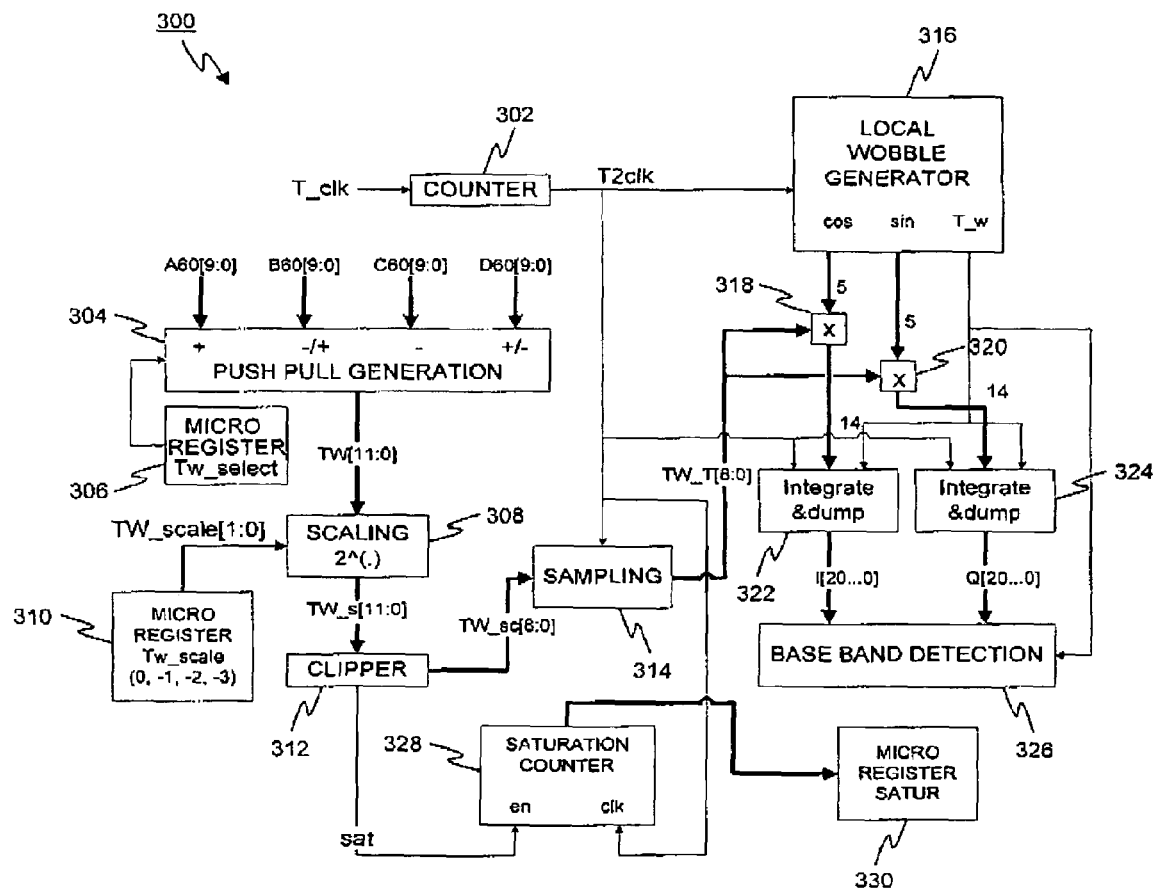
FIG. 3 shows a detailed diagram of the digital implementation of the wobble extraction.

A detailed diagram 300 of the digital implementation of the wobble extraction is shown in FIG. 3. The photodetector signals A, B, C, D are provided to a push pull generator 304. The track wobble signal is generated by summing the contribution of the four input signals A, B, C and D. The orientation of the sensors is unknown, wherefore two possibilities are considered: A+B−C−D or A+D−C−B.

They can be selected by a Tw_select bit from the microprocessor. Tw_select is stored in a microregister 306. The push pull signal is inputted to a scaling unit 308. A further microregister 310 provides a scaling factor Tw_scale. Further, the signal is inputted to a clipping element 312, a sampling element 314, which is clocked by T2clk, and then provided to multiplying elements 318 and 320. A clipper 312 provides a saturation signal sat, which is inputted to a saturation counter 328. The saturation counter 328 is clocked by T2clk and provides its output signal to a microregister 330. The multiplying elements 318, 320 further receive a sin and a cos signal from a local wobble generator 316, which makes use of the clock signal T2clk. The clock signal T2clk is generated from the clock signal T_clk using a counter 302. The local wobble generator 316 further provides the control signal T_w, which indicates the wobble period. The outputs of the multiplying elements 318, 320 are inputted to integration and dump elements 322 and 324, which also receive the clock signal T2clk as well as the T_w signal from the local wobble generator 316. The I and Q output signals from the integration and dump elements 322 and 324 are provided to a base band detector 326, which is also controlled by the T_w signal.

After the adder, the wobble signal is scaled and clipped, i.e. the dynamic range of the signal is reduced by three bits in a programmable way.

The clipper limits the signal to the maximum and minimum thresholds of its output dynamic range. A signal sat indicates whether the clipper is limiting the signal. A saturation counter counts the times when saturation happens. The result is read by the microprocessor, it is useful for the adjustment of the scaling factor Tw_scale at the input during testing.

A sub-sampling synchronizes the wobble signal Tw_sc using the divided clock T2clk.

The demodulator includes a local wobble generator and two multipliers for I- and Q-paths. The local wobble generator is programmable in the sense that for different media different frequencies of the local oscillator are generated.

Two integrate&dumps accumulate the input samples. At the end of each wobble period the accumulator restarts from 0 and the output holds the calculated value during the next calculation.

The data I and Q are passed to a base band detection at the wobble speed, since the integration period of the integrat&dump is exactly one wobble period.

Figure 4:
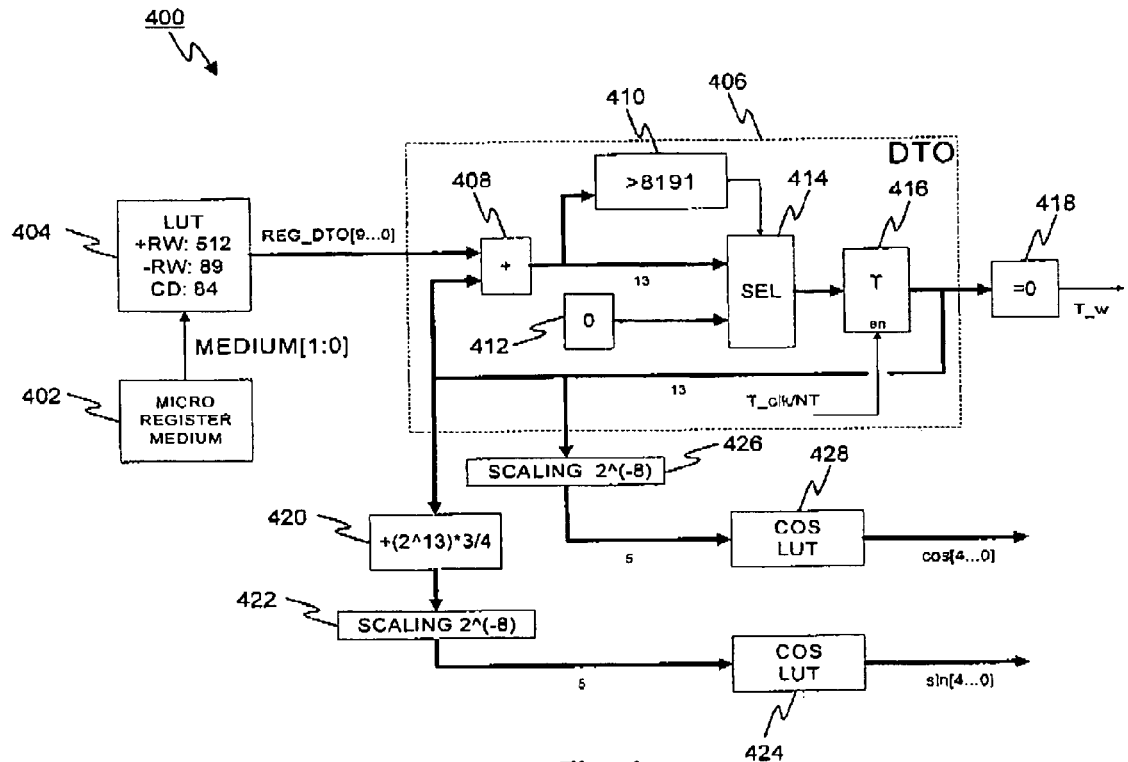
FIG. 4 depicts a scheme of a local wobble generator.

The local wobble generator is a 13 bits digitally tuned oscillator (DTO), which synthesizes the sinusoidal waveform in a digital way using only 32 samples to save silicon area: 15, 15, 14, 12, 11, 8, 6, 3, 0, −3, −6, −8, −11, −12, −14, −15, −15, −15, −14, −12, −11, −8, −6, −3, 0, 3, 6, 8, 11, 12, 14, 15. A scheme of the local wobble generator 400 is depicted in FIG. 4.

A microegister 402 provides a control signal to a look-up table 404. The read out values of the look-up table 404 are provided to a digitally turned oscillator 406, including an adder 408 for adding the input signal and the feedback signal, an accumulator 410 for generating a control signal for a selector 414, which selects either the signal provided by the adder 408 or a reset signal stored in a reset memory 412. The selected signal is provided to a flip flop 416, which stores the output value of the selector 414 at a certain time. The time signal for the flip flop 416 is T_clk/NT. The output signal of the digitally tuned oscillator is provided to a comparator 418, which outputs the control signal T_w. The output value of the digitally tuned oscillator 406 is also forwarded to a scaling unit 426 and to a cos look-up table 428, which provides a cos output signal. Further, the output signal of the digitally tuned oscillator 406 is forwarded to a phase shifter 420, to a scaling unit 422 and to a cos look-up table 424, which provides the sin output signal.

The 32 values are stored in a look-up table (LUT), which is used for both the sinus and the cosinus signal. The phase input is shifted by $3\pi/2$ for the sinus generation.

The resolution of five bits at the output of the look-up table is sufficient for generating a low distortion in terms of harmonics at the output. The distortion can be analyzed by applying a fast Fourier transform of the synthesized quantized waveform. A distortion caused by a specific harmonic is tolerable if that harmonic does not produce a significant contribution in the base band. Therefore, the amplitude of lower harmonics is more important. Higher harmonics correspond to high frequencies, where the noise and the interference of the data signal HF have a lower amplitude.

The phase for the generation of the wobble waveform is obtained using the five most significant bits of an accumulator of 13 bits. The bus of the accumulator favorably is large enough to generate an accurate frequency, according to the principles of frequency synthesis.

In this case the precision of the frequency is very important as the detection is based on phase variation. Therefore, the frequency precision is more important than the phase precision, which affects the output distortion. It is even possible to accept a certain distortion of the output without a noticeable consequence. In order to obtain a sufficiently reliable frequency, the accumulator is periodically set to 0 at the end of the wobble period. As a result there is no frequency error. The accumulator generates a ramp from 0 to 8191. The input of the accumulator depends on the medium and is stored in a further look-up table. The values in the further look-up table are pre-calculated according to the typical formula of frequency synthesis: $2^{13}$/Nws, where Nws is the number of wobble samples in the wobble period.

Considering the sub-sampling by two, Nws is equal to half of the number of channel bits per wobble Nw, which are summarized in the following Table 2.

| | DVD + R (W) | DVD − R (W) | CD − R (W) |
|---|---|---|---|
| channel bits per wobble (Nw) | 32 | 186 | 196 |
| Samples per wobble period (Nws) | 16 | 93 | 98 |
| Multiple/sub-multiple of the LUT elements | 32:2 = 16 | 32 × 3 = 96 | 32 × 3 = 96 |
| DTO input | 512 | 89 | 84 |

Fortunately the result is always close to a multiple or sub-multiple of the number of samples of the look-up table (32).

Figure 5:
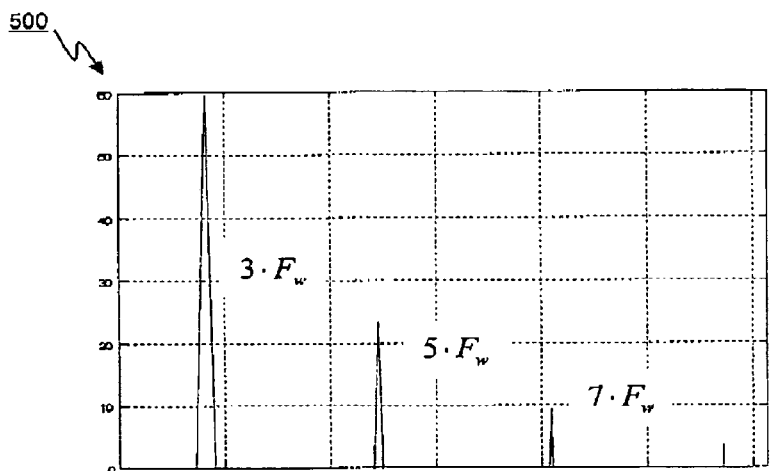
FIG. 5 shows the spectrum of local oscillator outputs (sin, cos) at the speed of 1x for +R(W)

In the case of +R(W), Nws is exactly equal to a sub-multiple. Therefore, the available samples of the look-up table are sufficient. The distortion (500) is only due to the quantisation of the 16 samples and it is limited to odd harmonics, which is depicted in FIG. 5.

In the case of CD and −R(W) the distortion is caused by several reasons:
  the samples of the look-up table are not sufficient, they are most of the times used three times,
  some values are not used three times, but they are used two or four times, and
  the samples are quantized.

Figure 6:
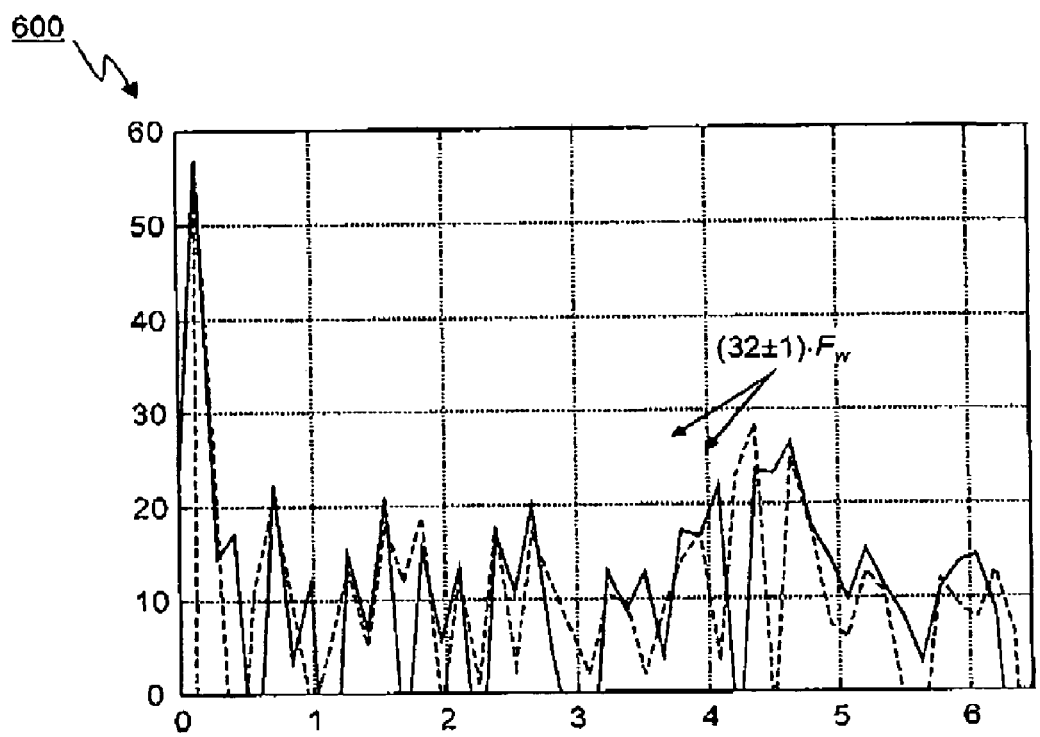
FIG. 6 shows the spectrum of local oscillator outputs (sin, cos) at the speed of 1x for −R(W)
Figure 7:
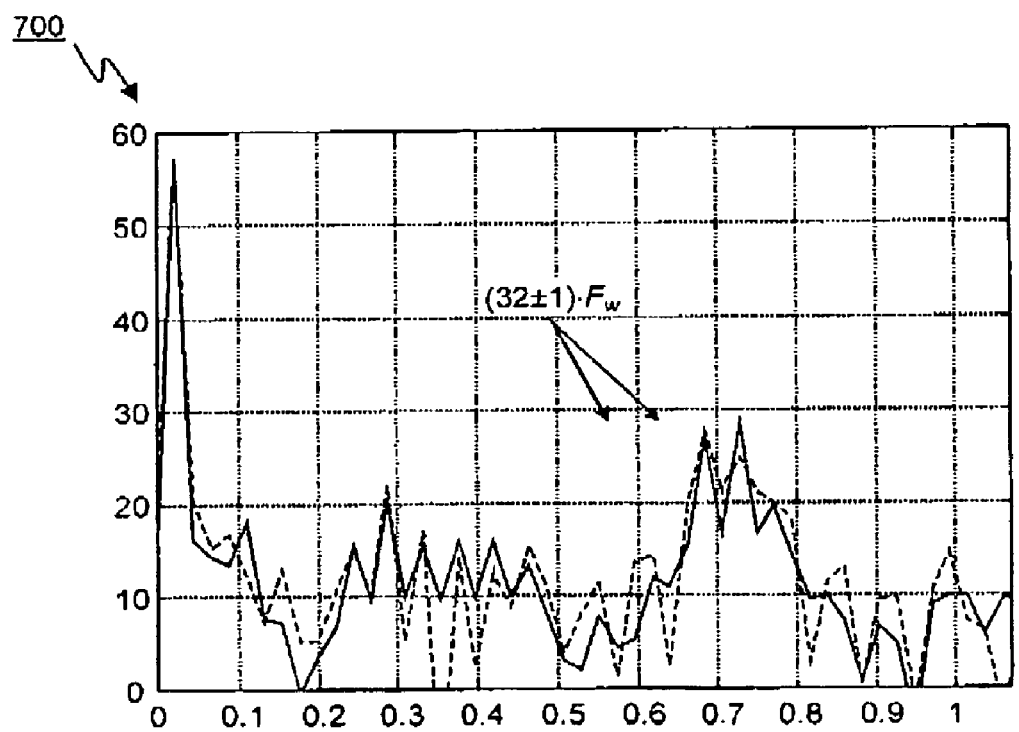
FIG. 7 shows the spectrum of local oscillator outputs (sin, cos) at the speed of 1x for CD.

The first reason causes most of the distortion, which is at the frequencies $(32 \cdot k \pm 1) \cdot F_W$, where $F_W$ is the wobble frequency and k is a positive integer. This distortion decreases at higher values of k and it folds back at lower frequencies, when the value of the frequency is higher than the Nyquist frequency. This is depicted in FIG. 6 and FIG. 7. So the main components are $(32 \pm 1) \cdot F_W$.

The distortion at these frequencies has a very small effect. In the case of DVD-R(W) and CD-R(W), the spectrum (600, 700) of the datasignal HF has an abundant attenuation at those frequencies. Therefore, it cannot produce a significant effect at the output of the correlator.

Figure 8:
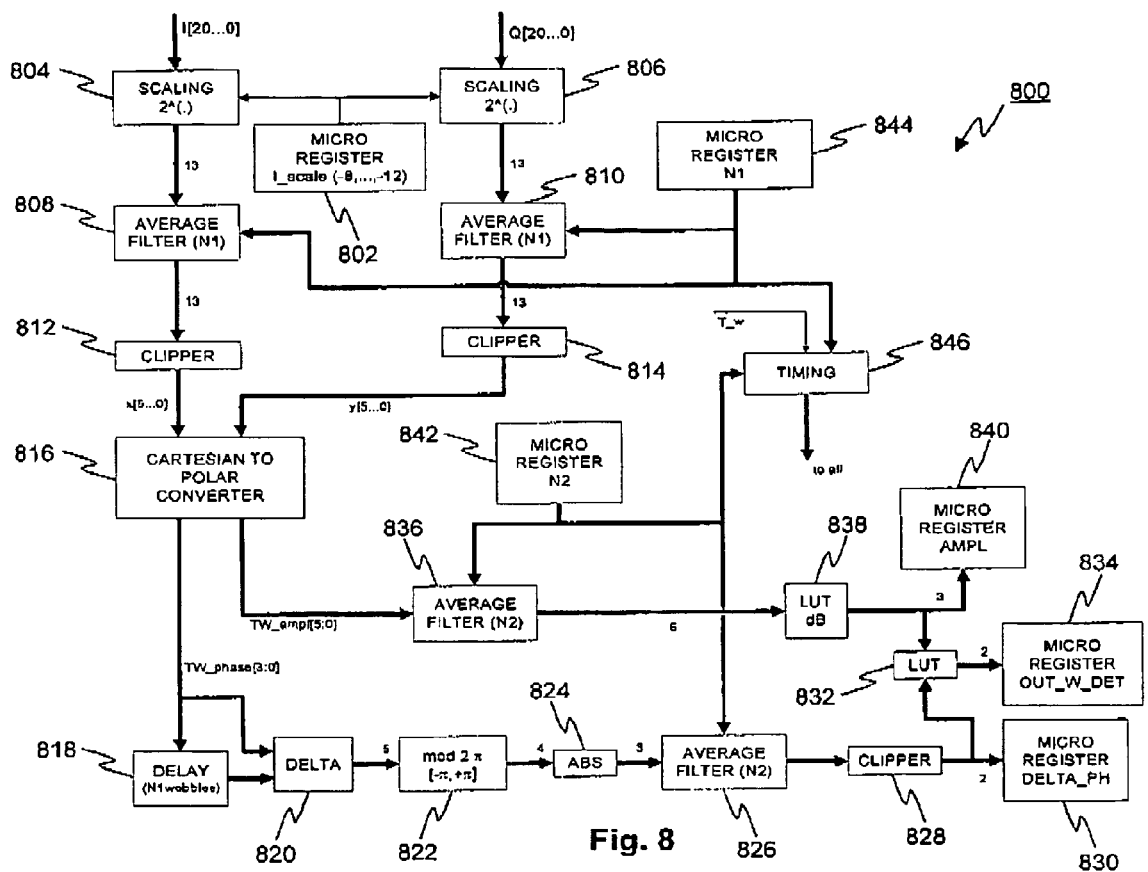
FIG. 8 schematically depicts a base band detector.

The design of the base band detection 800, which is shown schematically in FIG. 8, is the implementation of the back-end of the architecture shown in FIG. 2. The I and Q signals are provided to scaling units 804, 806, which are controlled by a microregister 802. The signals are further forwarded to average filter 808, 810, which average over N1 wobble periods. N1 is provided by a microregister 844. After clipping the I and Q signals by clippers 812 and 814, they are provided to a Cartesian to polar converter 816. The phase is provided to a system consisting of a cartesian to polar converter element 820, a modulus element 822, an absolute-value generator 824 and an average filter 826. The average filter a steering signal N2 from a microregister 842. the output signal of the average filter 426 is provided to a clipper signal is stored in a microregister 830 and is a first input signal for a look-up table 832. The amplitude signal of the cartesian to polar converter 816 is provided to an average filter 836, which is also define by N2, and to a look-up 838 to generate dB values. The result is stored in a microregister 840 and is a second input signal for the look-up table 832. The result of the look-up table 832 is stored in microregister 834. A timer 846 receives the quantities N1 from microregister 844 and N2 from microregister 842, as well as the control signal T_W from the local wobble generator 316, and generates a timing signal.

The processing speed is rather low, as it is equal to the wobble frequency. Actually the average filter uses the wobble clock to compute the average over N1 wobble periods.

At the Cartesian to Polar converter the speed of the signal is even slower. After the first pair of average filters the speed is reduced by N1, it is, therefore, equal to the wobble speed divided by N1. The second pair of average filters and also the computation of the average phase variation work at this speed. After the second pair of average filters the speed is again reduced, as it is divided by N2. Consequently, the micro registers, which store the result of the detector, are read at a very low speed.

The values N1 and N2 are programmed by the microprocessor, which also programs the scaling value. The scaling is needed for a normalization of the integration in the previous block. The scaling is programmable in the sense that it is able to attenuate the signal from $2^{-8}$ to $2^{-12}$. These values are different for each recording medium, because they depend on:

Nws, which determines the integration length of the previous block (see FIG. 3 and Table 2), and the amount of signal energy which is rejected in the correlation process of I and Q, due to its filtering effect. Clippers cut the seven most significant bits, thereby limiting the signal to the maximum and minimum thresholds of its output dynamic range.

A Cartesian to Polar converter with six bits inputs and four bits resolution for the phase and six bits resolution for the amplitude is sufficient for the detection. This means that the dynamic range is 36 dB for the inputs and for the amplitude. A phase resolution of $\pi/8$ is sufficient for the detection, wherefore the phase at the output of the converter has four bits. A delta increases the bits by one and the mod(●,$2\pi$) operation reduces the signal domain to the range ($-\pi,+\pi$), thereby loosing one bit. An absolute operation discards another bit, the sign bit, and the signal domain is in the range ($0,+\pi$). An average filter of the phase variation reduces the signal domain to the range ($0,+\pi/2$). In fact, when a wobble is present, the value is close to 0 and. When no wobble is present, the random absolute phase variation is uniformly distributed in its range ($0,+\pi$) and the average is $+\pi/2$. Considering that values higher than $+\pi/2$ can be handled by the detector as $+\pi/2$, the output of the average absolute phase variation is limited to less than $\pi/2$ by the clipper. Therefore, the output has four possible values: 0, $\pi/8$, $\pi/4$, $3\pi/8$.

The quantisation function of FIG. 1 and FIG. 2 is included in the average filter, which applies the quantisation through the division by N2. For the rejection of FM modulation in CD and for the rejection of noise in other cases, a floor quantisation is advantageous, which always rounds the output to the closest quantized value below it. In the digital implementation this corresponds to the rejection of some bits, considering that N2 is a power of 2.

Also the number of bits of the amplitude is reduced as much as possible by converting the signal to a logarithmic scale by means of a dB look-up table.

Finally, the information about amplitude and phase variations is summarized in a unique value, which is the output of the detector. This output is equal to zero when no wobble is present, and it is equal to three when a wobble is present. In case of intermediate values the microprocessor makes suitable decisions. For example, it may wait for another value or read the individual amplitude and phase variation values.

The Cartesian to Polar converter is the core of the base band detection. Its precision is important as it determines the performance of the whole detector. However, a very precise converter requires an expensive implementation.

Consequently, a proper trade-off between precision and implementation cost is employed. The solution is based on:

a simple addition of the amplitude of the two Cartesian components, and a look-up table for the phase calculation.

The calculation of the amplitude has an error, which is minimum for the case (1 0) and maximum for the case ($1/\sqrt{2}$ $1/\sqrt{2}$). In the first case the error is 0, in the second case the output is $\sqrt{2}$, instead of 1. The peak to peak value of the error in dB therefore is $$Epp_{dB}=20\cdot\log_{10}\sqrt{2}=3,$$

which corresponds to an error of ±1.5 dB. This error is acceptable considering that the amplitude of the wobble is about 30 dB over the noise.

Figure 9:
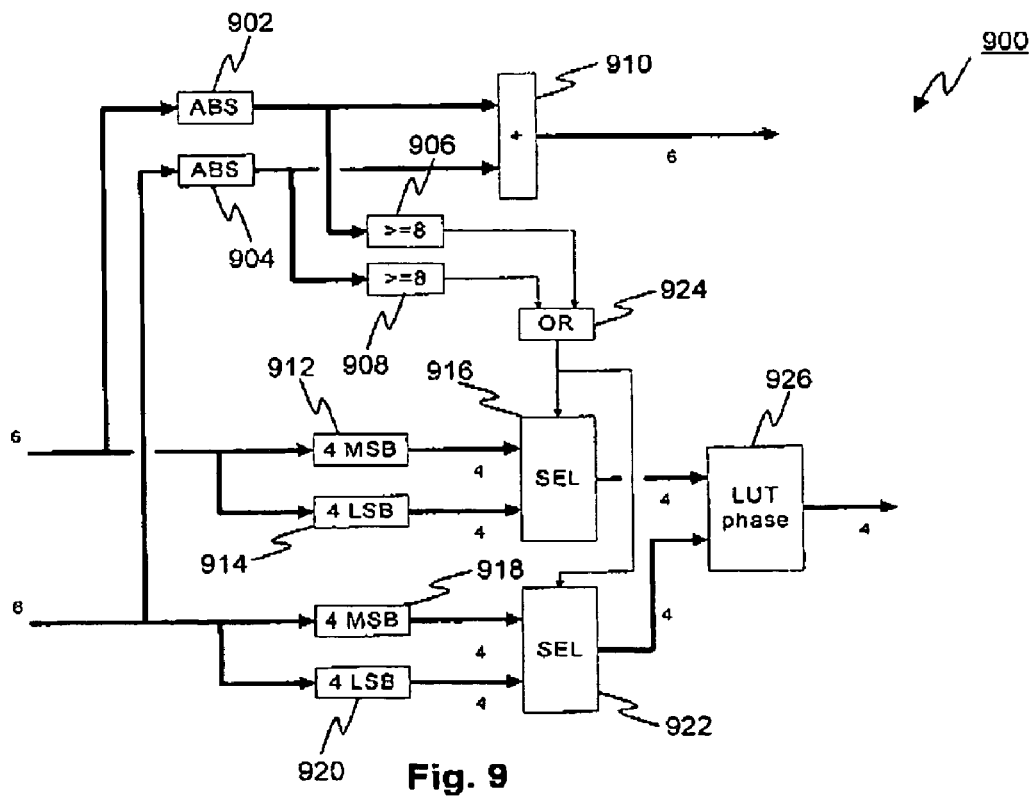
FIG. 9 shows a scheme of a Cartesian to Polar converter.

The calculation of the phase would need a large look-up table with twelve bits input. This can be reduced, considering that the result is the same when the two input components are equally attenuated. This can be done without severe consequences when the two components are large enough. Otherwise, in the case of too small components, the quantisation error of the look-up table would increase. Therefore, the dynamic range of the look-up table is reduced to fewer bits. FIG. 9 illustrates an implementation of the converter following this approach.

The Cartesian to polar converter 900 receives the I and Q signals, which are provided to absolute value generators 902, 904. Their outputs are forwarded to adder 910, which builds the sum of the absolute value signals and provides the amplitude signal. Further the absolute value signals are provided to checking elements 906, 908, which check for each component if it is greater than eight, and generate a steering signal. The two steering signals are provided to an or element 924. The result of the or operation is the steering signal for selectors 916 and 922. The I signal is divided in its four most significant bits and its four least significant bits by blocks 912 and 913, respectively. Both signals are input signals of selector 916. The Q signal is divided in its four most significant bits and its four least significant bits by blocks 918 and 920, respectively. Both signals are input signals of selector 922. The selectors 916 and 922 provide the input signals for a look-up table 926, which provides the phase signal.

Therefore, the look-up table can be reduced to four plus four bits input.

The output values of the look-up table are listed in the following Table 3.

| | | | | | | | x:−8...7 | | | | | | | | |
|---|---|---|---|---|---|---|---|---|---|---|---|---|---|---|---|
| y:−8...7 −6 | −6 | −6 | −6 | −6 | −5 | −5 | −5 | −4 | −4 | −4 | −4 | −3 | −3 | −3 | −3 |
| −7 | −6 | −6 | −6 | −6 | −6 | −5 | −5 | −4 | −4 | −4 | −3 | −3 | −3 | −3 | −2 |
| −7 | −7 | −6 | −6 | −6 | −6 | −5 | −5 | −4 | −4 | −4 | −3 | −3 | −3 | −2 | −2 |
| −7 | −7 | −7 | −6 | −6 | −6 | −5 | −5 | −4 | −4 | −4 | −3 | −3 | −2 | −2 | −2 |
| −7 | −7 | −7 | −7 | −6 | −6 | −6 | −5 | −4 | −4 | −3 | −3 | −2 | −2 | −2 | −2 |
| −8 | −7 | −7 | −7 | −7 | −6 | −6 | −5 | −4 | −4 | −3 | −2 | −2 | −2 | −2 | −2 |
| −8 | −8 | −8 | −8 | −7 | −7 | −6 | −6 | −4 | −3 | −2 | −2 | −2 | −1 | −1 | −1 |
| −8 | −8 | −8 | −8 | −8 | −8 | −7 | −6 | −4 | −2 | −2 | −1 | −1 | −1 | −1 | −1 |
| 7 | 7 | 7 | 7 | 7 | 7 | 7 | 7 | X | 0 | 0 | 0 | 0 | 0 | 0 | 0 |
| 7 | 7 | 7 | 7 | 7 | 7 | 6 | 6 | 4 | 2 | 1 | 0 | 0 | 0 | 0 | 0 |
| 7 | 7 | 7 | 7 | 6 | 6 | 6 | 5 | 4 | 2 | 2 | 1 | 1 | 0 | 0 | 0 |
| 7 | 6 | 6 | 6 | 6 | 6 | 5 | 4 | 4 | 3 | 2 | 2 | 1 | 1 | 1 | 1 |
| 6 | 6 | 6 | 6 | 6 | 5 | 5 | 4 | 4 | 3 | 2 | 2 | 2 | 1 | 1 | 1 |
| 6 | 6 | 6 | 6 | 5 | 5 | 4 | 4 | 4 | 3 | 3 | 2 | 2 | 2 | 1 | 1 |
| 6 | 6 | 6 | 5 | 5 | 5 | 4 | 4 | 4 | 3 | 3 | 2 | 2 | 2 | 2 | 1 |
| 6 | 6 | 5 | 5 | 5 | 5 | 4 | 4 | 4 | 3 | 3 | 2 | 2 | 2 | 2 | 2 |

Figure 10:
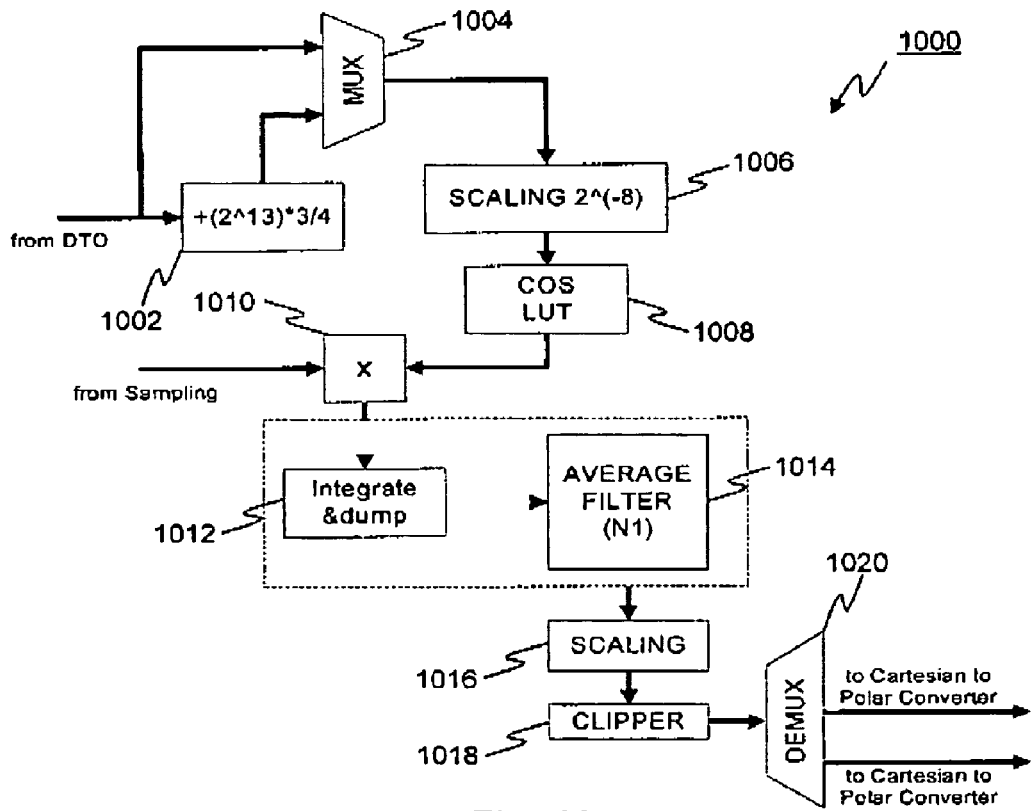
FIG. 10 outlines a scheme of a wobble detector operating in time multiplex.

The wobble detector includes two identical paths running at half of the speed of the clock T_clk. In order to reduce the silicon area of the demodulator, the two paths can be processed in time multiplex, using the clock T_clk instead of the clock T2clk. This means that only the resources for one path are implemented, which are used in time multiplex by a multiplexer 1004 at the speed of the clock T_clk, after one of the input signal is phase shifted by a phase shifter 1002. The resources used in time multiplex include the cos look-up table 1008, the scaling unit 1006 at the input of the cos LUT, 1008, the multiplier 1010 receiving the result of the cos look-up table 1008 and the Sampling signal, the integrate&dump, element 1012 connected to the multiplier 1012, the average filter (N1) 1014 connected to the integrate&dump 1012, which is connected to the scaling element 1016 and the clipper 1018, as depicted in FIG. 10. The output signal of the clipper 1018 is demultiplexed by a demultiplexed 1020. A further reduction is possible by integrating the average filter and the integrate&dump, using a unique accumulator of larger size.

What is claimed is:

1. Method for detecting the type of wobble on an optical recording medium, comprising the steps of:

detecting the wobble at different frequencies with a programmable digitally tuned oscillator,
   converting the wobble signal to the base band,
   determining the amplitude and the phase of the wobble, and
   using the consistency of the phase of the wobble together with the amplitude of the wobble for verifying the presence of the wobble.

2. Method according to claim 1, further comprising the step of generating a sinus signal and/or a cosinus signal using a reduced number of bits with a look-up table with an input and an output included in the digitally tuned oscillator.

3. Method according to claim 1, wherein the consistency of the phase is measured by computing the quantized averaged absolute phase variation.

4. Method according to claim 1, further comprising the step of synchronizing the detection of the wobble with a clock locked to the speed of the recording medium.

5. Method according to claim 1, further comprising the step of increasing the frequency selectivity of the wobble detection by increasing a value of an average filter.

6. Method according to claim 1, further comprising the step of determining the amplitude and/or the phase of the wobble with a Cartesian to Polar converter.

7. Method according to claim 6, wherein the amplitude of the wobble is determined by an addition of the Cartesian components in the Cartesian to Polar converter.

8. Method according to claim 6, further comprising the steps of:

using an 8 bits input 4 bits output look-up table for the Cartesian to Polar converter, and
   attenuating the Cartesian components when at least one of the Cartesian components is out of the 4 bits dynamic range.

9. Method according to claim 6, further comprising the step of rejecting a wobble modulation with an average filter before the Cartesian to Polar converter.

10. Method according to claim 1, further comprising the steps of:

using a divided clock instead of the clock locked to the speed of the recording medium, and
    processing at least two paths of wobble detection in time multiplex.

11. Device for detecting the type of wobble on an optical recording medium, comprising:

a programmable digitally tuned oscillator for detecting the wobble at different frequencies, and
    a converter for converting the wobble signal to the base band,
    a comparator using the consistency of the phase of the wobble together with the amplitude of the wobble for verifying the presence of the wobble.

12. Apparatus for reading from and/or writing to optical recording media, wherein it performs a method according to claim 1, including a device for detecting, a device for converting, a device for determining, and a device for using.

* * * * *